(12) United States Patent
Mitsuo et al.

(10) Patent No.: US 7,806,433 B2
(45) Date of Patent: Oct. 5, 2010

(54) HEAD PROTECTING AIRBAG SYSTEM

(75) Inventors: Tetsu Mitsuo, Nissin (JP); Akihiko Narui, Yokohama (JP); Mitsuo Nogami, Yokohama (JP)

(73) Assignees: Toyota Jidosha Kabushiki Kaisha, Toyota (JP); Autoliv Development AB, Vargarda (SE)

( * ) Notice: Subject to any disclaimer, the term of this patent is extended or adjusted under 35 U.S.C. 154(b) by 549 days.

(21) Appl. No.: 11/892,889

(22) Filed: Aug. 28, 2007

(65) Prior Publication Data

US 2008/0054605 A1    Mar. 6, 2008

(30) Foreign Application Priority Data

Aug. 31, 2006 (JP) .............................. 2006-236019

(51) Int. Cl.
*B60R 21/213* (2006.01)
*B60R 21/231* (2006.01)
*B60R 21/237* (2006.01)

(52) U.S. Cl. ................ 280/730.2; 280/728.2; 280/743.1
(58) Field of Classification Search .............. 280/728.2, 280/730.2, 743.1
See application file for complete search history.

(56) References Cited

U.S. PATENT DOCUMENTS

| 6,123,355 | A  | * | 9/2000 | Sutherland ................ 280/728.2 |
| 6,254,123 | B1 | * | 7/2001 | Urushi et al. ............. 280/730.2 |
| 6,305,707 | B1 | * | 10/2001 | Ishiyama et al. ......... 280/728.2 |
| 6,361,069 | B1 | * | 3/2002 | Saito et al. ................ 280/730.2 |
| 6,371,512 | B1 |   | 4/2002 | Asano et al. |
| 6,471,240 | B2 | * | 10/2002 | Bakhsh et al. ............... 280/729 |
| 6,520,533 | B2 | * | 2/2003 | Tanase et al. ............. 280/730.2 |
| 6,527,296 | B2 | * | 3/2003 | Bakhsh et al. ........... 280/730.2 |
| 6,530,594 | B1 | * | 3/2003 | Nakajima et al. ........ 280/730.2 |
| 6,722,693 | B2 | * | 4/2004 | Ikeda et al. .............. 280/730.2 |
| 6,742,806 | B2 | * | 6/2004 | Ogawa et al. ............... 280/732 |
| 6,758,490 | B2 |   | 7/2004 | Hoeft et al. |
| 6,811,184 | B2 | * | 11/2004 | Ikeda et al. .................. 280/742 |
| 7,077,425 | B2 | * | 7/2006 | Ogawa et al. ............. 280/730.2 |
| 7,080,853 | B2 | * | 7/2006 | Ogata ....................... 280/730.2 |
| 7,114,744 | B2 | * | 10/2006 | Sunabashiri ............. 280/730.2 |
| 7,163,232 | B2 | * | 1/2007 | Yokoyama et al. ........ 280/730.2 |
| 7,172,211 | B2 | * | 2/2007 | Hirose ...................... 280/730.2 |
| 7,213,836 | B2 | * | 5/2007 | Coon et al. .............. 280/730.2 |

(Continued)

FOREIGN PATENT DOCUMENTS

JP    A-11-321538    11/1999

(Continued)

*Primary Examiner*—Paul N Dickson
*Assistant Examiner*—Laura Freedman
(74) *Attorney, Agent, or Firm*—Oliff & Berridge, PLC

(57) ABSTRACT

A supplemental inflation part is formed in a portion of an upper-end side inflation section of an airbag, the portion overlapping a B-pillar garnish. The supplemental inflation part has a semicircular shape that forms a push-out part. Folding the push-out part allows the upper-end side inflation section to be inflated largely at the initial stage of deployment of the airbag. Thus, the airbag is pushed toward the passenger compartment with greater force upon its deployment. Therefore, a terminal part of a headliner that covers the folded airbag is largely opened so that the airbag deploys smoothly downward along the side of the vehicle body in the passenger compartment without interference from the top end of the B-pillar garnish.

13 Claims, 9 Drawing Sheets

U.S. PATENT DOCUMENTS

| | | | |
|---|---|---|---|
| 7,267,364 B2 * | 9/2007 | Noguchi et al. | 280/730.2 |
| 7,273,228 B2 * | 9/2007 | Noguchi et al. | 280/730.2 |
| 7,278,655 B2 * | 10/2007 | Inoue et al. | 280/730.2 |
| 7,322,600 B2 * | 1/2008 | Inoue et al. | 280/730.2 |
| 7,338,071 B2 * | 3/2008 | Noguchi et al. | 280/730.2 |
| 7,347,447 B2 * | 3/2008 | Nakanishi | 280/730.2 |
| 7,350,804 B2 * | 4/2008 | Bakhsh et al. | 280/730.2 |
| 7,404,790 B2 * | 7/2008 | Sugaya et al. | 493/458 |
| 7,673,897 B2 * | 3/2010 | Ochiai | 280/730.2 |
| 7,731,225 B2 * | 6/2010 | Yoshida | 280/730.2 |
| 7,731,227 B2 * | 6/2010 | Hotta et al. | 280/730.2 |
| 2006/0131849 A1 * | 6/2006 | Ochiai | 280/730.2 |

FOREIGN PATENT DOCUMENTS

| | | |
|---|---|---|
| JP | A-2002-337648 | 11/2002 |
| JP | A 2003-11767 | 1/2003 |
| JP | B2 3656156 | 1/2003 |
| JP | A 2005-29035 | 2/2003 |
| JP | A 2004-58848 | 2/2004 |
| JP | A 2004-106722 | 4/2004 |
| JP | A-2006-175920 | 7/2006 |
| JP | B2 3915643 | 5/2007 |

* cited by examiner

HEAD PROTECTING AIRBAG SYSTEM

INCORPORATION BY REFERENCE

The disclosure of Japanese Patent Application No. 2006-236019 filed on Aug. 31, 2006 including the specification, drawings and abstract is incorporated herein by reference in its entirety.

BACKGROUND OF THE INVENTION

1. Field of the Invention

The present invention relates to a head protecting airbag system that deploys an airbag downward along the side of a vehicle body in a passenger compartment when the vehicle is involved in either a side collision or a rollover. In particular, the present invention relates to a head protecting airbag system that deploys an inflation section between an occupant's head and the vehicle body.

2. Description of the Related Art

In the recent trends, a head protecting airbag system is mounted in vehicles as a supplemental restraint system. The head protection airbag system has a curtain airbag that is deployed downward from a roof side rail when the vehicle is involved in a side collision or rollover. As one of such head protecting airbag systems, there has been proposed a head protecting airbag system designed to deploy the airbag between the head of the occupant and the side of the vehicle body in order to protect the occupant's head.

This type of head protecting airbag system is described in Japanese Patent Application Publication No. 2004-58848 (JP-A-2004-58848). In this head protecting airbag system, the airbag includes a gas supply path and a main inflation part disposed on the lower side of the gas supply path. The airbag is folded with the main inflation part rolled up toward the outer side in the vehicle and with the gas supply path not rolled, but folded for the sake of easier deployment of the airbag upon gas supply. In addition, in Japanese Patent Publication No. 3656156, at the initial stage of deployment of the airbag, a part of the airbag deploys into a thin plate shape between the pillar and the headrest of the occupant seat with no gas supplied. Then, gas is supplied into the thin plate airbag from an inflow port formed on the lower side of the airbag. This prevents the inflating airbag from being interfered with by the headrest of the occupant seat.

However, in order to immediately deploy the airbag in the longitudinal direction of the vehicle along the side of the passenger compartment, the airbag has to initially deploy inward towards the passenger compartment over the top end of the pillar garnish.

SUMMARY OF THE INVENTION

The present invention provides ahead protecting airbag system having an airbag that is deployed between an occupant's head and a side vehicle body without interference from the top end of a pillar garnish.

A first aspect of the invention is directed to a head protecting airbag system. The head protecting airbag system has: an inflator located in a predetermined position on a vehicle, that is activated upon at least one of a side collision and a rollover of the vehicle; an airbag including a gas supply path connected to the inflator, and an inflation section connected to the gas supply path to protect a head of an occupant, wherein the airbag is folded up in a vehicle height direction and stored along a roof side rail section of the vehicle, and is deployed by gas from the inflator downward along a side of a vehicle body in a passenger compartment; a pillar garnish provided on a side of the vehicle body in the passenger compartment; and an airbag guide mechanism, provided at a location above the pillar garnish, that guides the deployment of the airbag toward the passenger compartment, in which the gas supply path includes a pillar covering part provided at a location corresponding to an upper part of the pillar garnish and a window covering part provided at a location corresponding to an upper part of a side window of the vehicle, and when the airbag is deployed, the pillar covering part protrudes further into the passenger compartment than the window covering part.

When a side collision or rollover occurs, the inflator is activated to supply gas into the airbag that is folded-up in the vehicle height direction and stored along the roof side rail section of the vehicle. This allows downward deployment of the airbag along the side of the vehicle body in the passenger compartment. The airbag includes the gas supply path that connects the inflator and the inflation section; the inflation section is designed to protect a occupant's head.

According to the invention, the pillar covering part of the gas supply path is provided at the location corresponding to the upper part of the pillar garnish. The window covering part of the gas supply path is provided at the location corresponding to the upper part of the side window. When the gas supply path is deployed, the pillar covering part of the gas supply path protrudes further into the passenger compartment than the window covering part. During the initial stage of deployment of the airbag, the pillar covering part is deployed, thereby pushing out the folded airbag in a inward towards the passenger compartment. The airbag is also guided by the airbag guide mechanism provided above the pillar garnish and moved largely inward towards the passenger compartment. This allows the airbag to be deployed inward towards the passenger compartment over a top end of the pillar garnish.

As described above, the invention allows the airbag to be deployed between the occupant's head and the side of the vehicle body without interference from the pillar garnish in the process of deployment of the airbag.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

A head protecting airbag system according to the first embodiment of the invention will be described below with reference to FIGS. 1 to 3.

Figure 1:
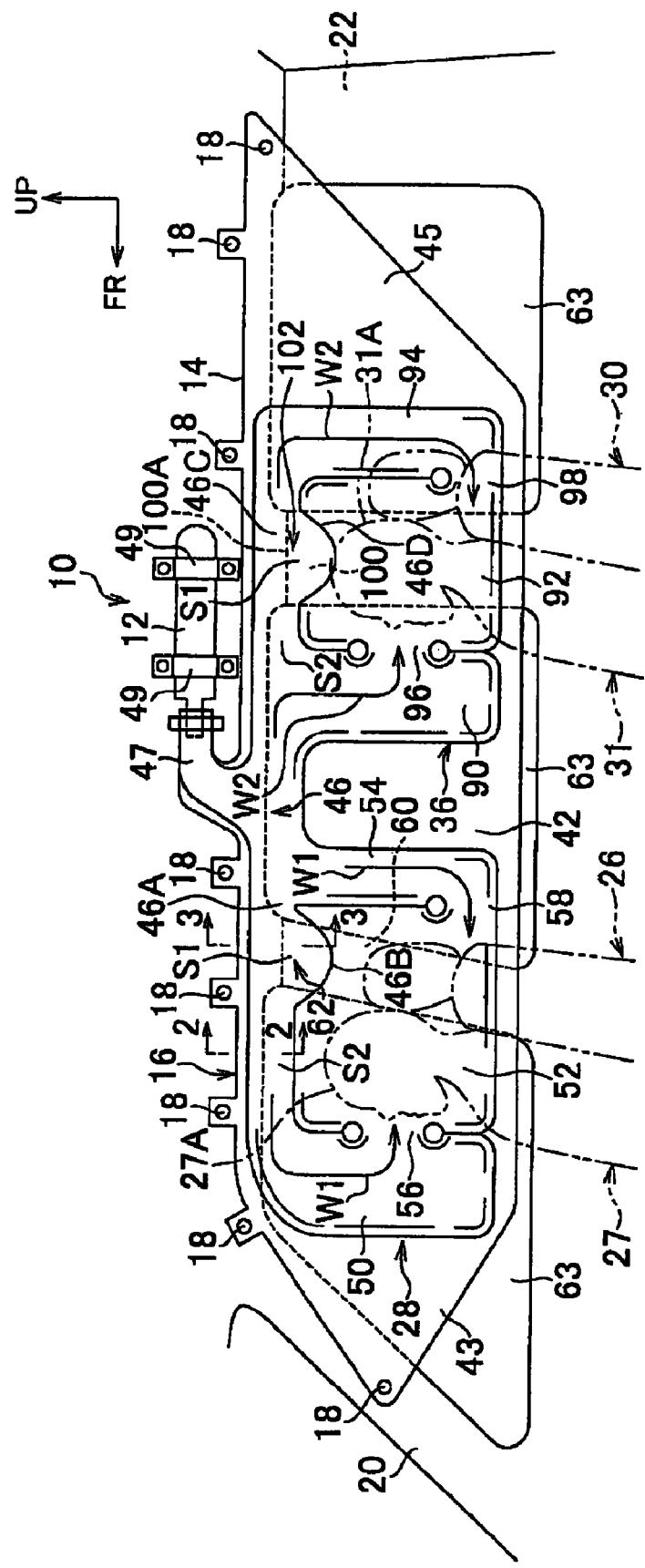
FIG. 1 is a side view of a head protecting airbag system according to the first embodiment of the invention, in the deployed state.
Figure 2:
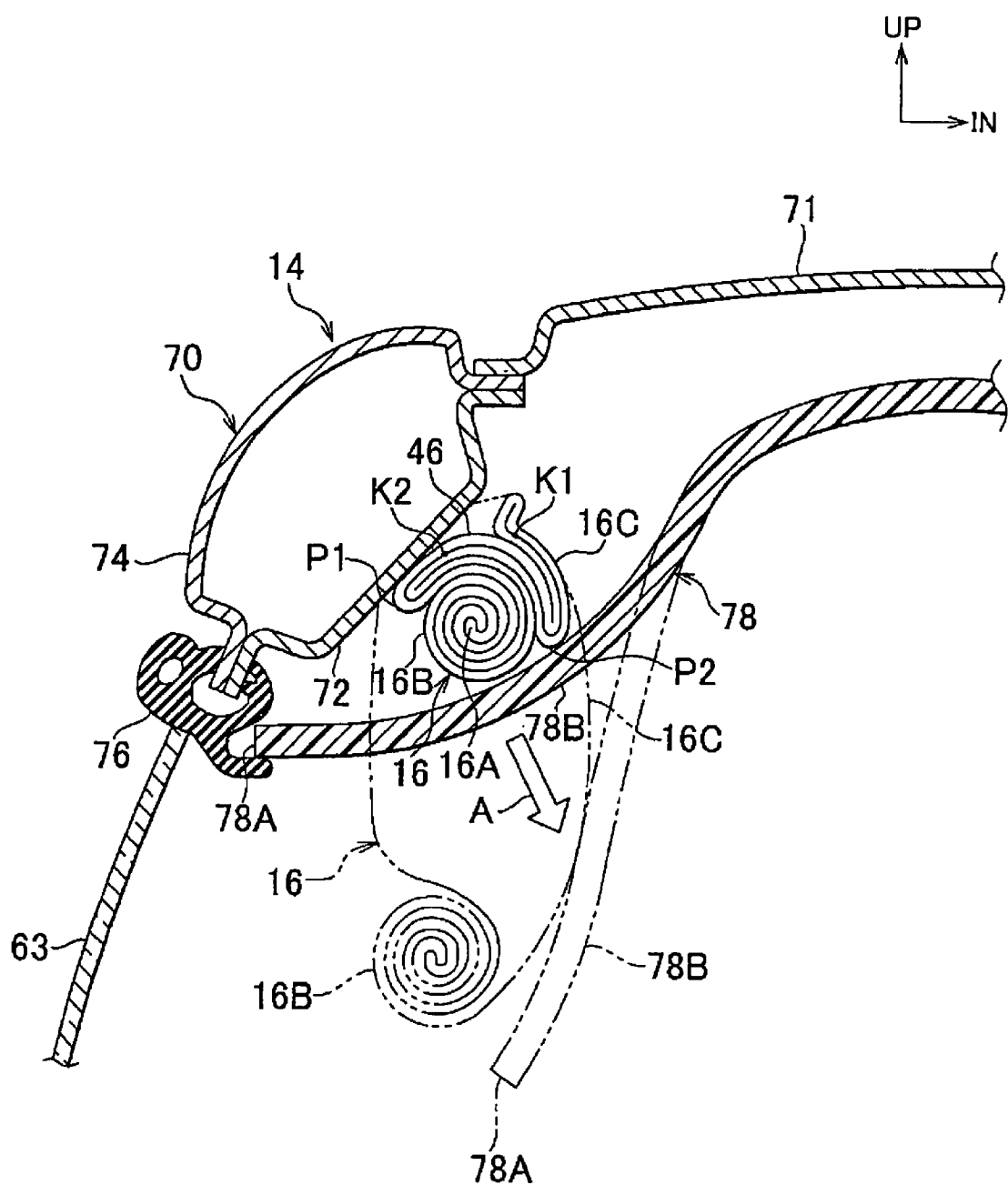
FIG. 2 is an enlarged sectional view taken along the line 2-2 in FIG. 1, illustrating the stored air bag.
Figure 3:
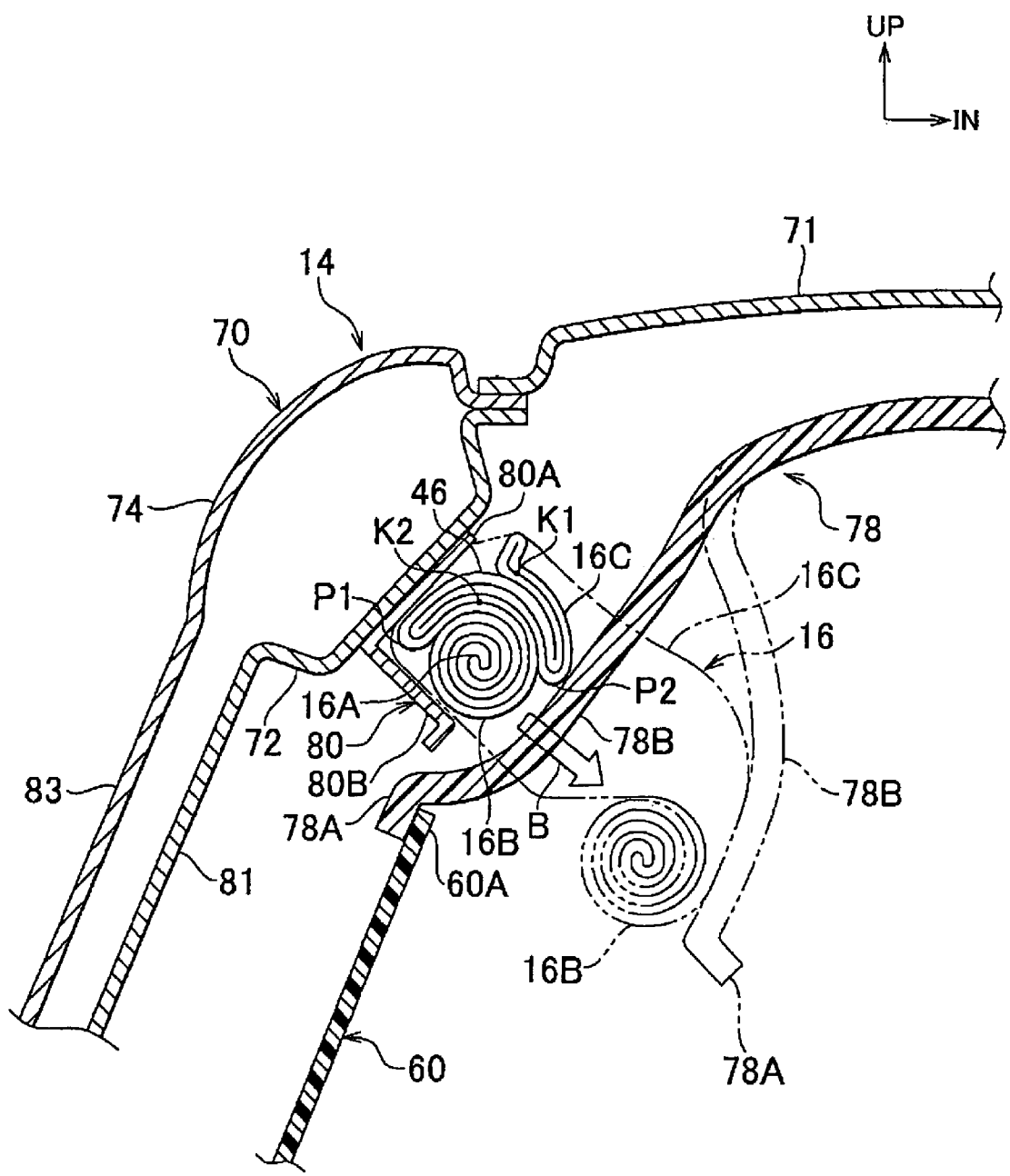
FIG. 3 is an enlarged sectional view taken along the line 3-3 in FIG. 1, illustrating the stored air bag.

In FIGS. 1 to 3, the arrow FR and the arrow UP indicate forward direction and upward direction of the vehicle, respectively, while the arrow IN indicates inward direction with respect to the vehicle width.

FIG. 1 is a side view of a head protecting airbag system 10 according to the first embodiment, in which the airbag 16 is deployed.

As shown in FIG. 1, the head protecting airbag system 10 includes a cylindrical inflator 12 and the airbag 16. The inflator 12 injects gas from its gas injecting portion when the airbag system 10 is activated. The gas injecting portion of the inflator 12 connects to the airbag 16. The airbag 16 is folded-up in the vehicle height direction into an elongated shape extending in the vehicle longitudinal direction, such that the folded airbag 16 is stored along a roof side rail section 14.

The inflator 12 is activated by an airbag controller (not shown) when a side collision sensor (not shown), which is located in position on the side vehicle body, detects a side collision or when a rollover sensor (not shown), which is located at around the center of the vehicle body, detects a rollover.

Attachment points 18 are provided at predetermined intervals along an upper S outside edge of the airbag 16. The airbag 16 is supported at the attachment points 18 to body components, such as a front pillar 20 (A-pillar), the roof side rail section 14, and a D-pillar 22.

The airbag 16 includes: a front inflation section 28 (front seat inflation section); a rear inflation section 36 (rear seat inflation section); a non-inflation section 42; and an upper-end side inflation section 46; a non-inflation section 43, and a non-inflation section 45. The front inflation section 28 is designed to protect a head 27A of an occupant 27 seated on a front seat 26. The rear inflation section 36 is designed to protect a head 31A of an occupant 31 seated on a rear seat 30. The non-inflation section 42 has a flat rectangular shape, and is located between the front inflation section 28 and the rear inflation section 36. The upper-end side inflation section 46 extends along the upper portion of the airbag 16 in the vehicle longitudinal direction, and communicates the front inflation section 28 and the rear inflation section 36 with each other on their upper-end side. The non-inflation section 43 has a flat triangular shape, and is located to the front of the front inflation section 28. The non-inflation section 45 has a flat triangular shape, and is located to the rear of the rear inflation section 36.

Further, a gas introducing section 47 is provided at a longitudinally middle portion of the upper-end side inflation section 46 in the airbag 16. The gas introducing section 47 connects to the gas injecting portion of the inflator 12. The inflator 12 is fastened to the vehicle body with a pair of mounting brackets 49 with its gas injecting portion inserted into the gas introducing section 47. In other words, the head protecting airbag system 10 according to the first embodiment of the invention employs inflator centering arrangement in which the inflator 12 is located at around the center portion of the upper edge side of the airbag 16.

The front inflation section 28 is constituted by three cylindrical cells 50, 52, 54 arranged next to each other in the vehicle longitudinal direction. The cylindrical cells 50, 52, 54 extend approximately in the vehicle height direction.

The cell refers to an inflated portion that is inflated by gas supplied from the inflator, but does not include a non-inflation section that forms an outer periphery of the inflated portion.

The front cell 50 and the rear cell 54 have respective upper-end openings. These openings connect to a front part 46A of the upper-end side inflation section 46. The center cell 52 has a gas introducing part 56 at its vertical center portion on the forward side. The center cell 52 connects through the gas introducing part 56 to the vertical center portion of the front cell 50 on its rearward side. The center cell 52 also has a gas introducing part 58 at its lower end portion on the rearward side. The center cell 52 connects through the gas introducing part 58 to the lower end portion of the rear cell 54 on its forward side.

Thus, gas injected from the inflator 12 flows through the upper-end side inflation section 46 downward into the front cell 50 and the rear cell 54 along the path W1, as well as into the center cell 52 through the gas introducing parts 56 and 58.

When the airbag 16 is deployed, a B-pillar garnish 60 is situated on the side of the deployed airbag that faces the outside of the vehicle, near the central portion of the cell 52 in the vehicle longitudinal direction. The upper-end side inflation section 46 includes a supplemental inflation part 46B, which serves as a pillar covering part, at which the upper-end side inflation section 46 overlaps the B-pillar garnish 60 in the side view where the airbag 16 has been deployed. The supplemental inflation part 46B protrudes downward into a semicircular shape. Specifically, the pillar covering part of the upper-end side inflation section 46 is provided at a location corresponding to the upper part of the B-pillar garnish 60 to form a push-out part 62. Also, the upper-end side inflation section 46 includes a window covering part, which does not overlap the B-pillar garnish 60. The window covering part is provided at a location corresponding to the upper part of a side window 63. When the upper-end side inflation section 46 is deployed, a sectional area S1 of the push-out part 62 is at least larger than a sectional area S2 of the window covering part, when viewed in the vehicle longitudinal direction.

Therefore, when the upper-end side inflation section 46 is deployed, the push-out part 62 (pillar covering part) protrudes further into the passenger compartment than the window covering part.

FIG. 2 is an enlarged sectional view taken along the line 2-2 in FIG. 1, illustrating the stored airbag. FIG. 3 an enlarged sectional view taken along the line 3-3 in FIG. 1, illustrating the stored airbag.

As shown in FIG. 2, the roof side rail section 14 includes a roof side rail 70 that is an outline frame member of the roof side rail section 14. The roof side rail 70 has a closed structure in section, including a roof side rail inner panel 72 and a roof side rail outer panel 74. The roof side rail inner panel 72 is positioned closer to the passenger compartment than the roof side rail outer panel 74. The roof side rail inner panel 72 and the roof side rail outer panel 74 have their respective lower flanges fitted into an opening trim 76. The airbag 16 is fastened to the roof side rail inner panel 72 at the attachment points 18 shown in FIG. 1 by means of a fastening member (not shown), such as bolt. A headliner 78 includes a headliner edge 78A and a terminal part 78B. The headliner edge 78A engages with the opening trim 76. The terminal part 78B covers the folded airbag 16.

The airbag 16 includes a bottom end part 16A, a rolled part 16B, and a folded part 16C. When the airbag 16 is deployed, the bottom end part 16A is located at the bottom end of the airbag 16. The rolled part 16B is formed by rolling-up a part of the airbag 16 from the bottom end part 16A. The folded part 16C is formed by folding-back the remaining part of the airbag 16 at a fold P1 on the outer side and a fold P2 on the inner side with respect to the vehicle width.

As shown in FIG. 2, in the window covering part, the upper-end side inflation section 46 of the airbag 16 does not have the supplemental inflation part 46B. In other words, the window covering part does not overlap the B-pillar garnish 60 in the side view where the upper-end side inflation section 46 is deployed. In the window covering part, the fold P2 is located between a position K1 and a position K2, die position K1 being at a top end of the deployed upper-end side inflation section 46, the position K2 being at a bottom end thereof. Thus, inflating the upper-end side inflation section 46 allows the rolled part 16B of the airbag 16 to be pushed towards the passenger compartment (in the direction shown by the arrow A in FIG. 2). Consequently, as shown by the chain double-dashed line in FIG. 2, the headliner edge 78A of the headliner 78 disengages from the opening trim 76, while the terminal part 78B of the headliner 78 is opened toward the passenger compartment. This allows the airbag 16 to be deployed downward along the side of the vehicle body in the passenger compartment.

In the window covering part, the upper-end side inflation section 46 of the airbag 16 does not have the supplemental inflation part 46B. The distance between the position K1 and the position K2, which are respectively at the top end and the bottom end of the deployed upper-end side inflation section 46, is so short that the fold P1 is not located within the upper-end side inflation section 46 (the position K2 does not reach the fold P1). Instead, the fold P1 is located in the upper portion of the cell 52.

As shown in FIG. 2, the roof side outer panel 74 is connected to a roof panel 71.

As shown in FIG. 3, immediately above a top end 60A of the B-pillar garnish 60, a metal jump stand 80 is provided as an airbag guide mechanism. Viewed from the front of the vehicle, the jump stand 80 is formed in an L-shape, and includes a longitudinal wall 80A that is fastened to the roof side rail inner panel 72 with a fastening member (not shown), such as bolt. The jump stand 80 also includes a lateral wall (guide wall) 80B that extends inward toward the passenger compartment from the bottom end of the longitudinal wall 80A.

The airbag 16 is attached to the roof side rail inner panel 72 at the attachment points 18 shown in FIG. 1 by means of a fastening member (not shown), such as bolt. The headliner 78 includes the headliner edge 78A and the terminal part 78B. The headliner edge 78A engages with the top end 60A of the B-pillar garnish 60. The terminal part 78B covers the folded airbag 16.

The upper-end side inflation section 46 of the airbag 16 includes the supplemental inflation part 46B that protrudes downward into a semicircular shape in the side view, at which the upper-end side inflation section 46 overlaps the B-pillar garnish 60. The supplemental inflation part 46B forms the push-out part 62 (see FIG. 1). Therefore, in the upper-end side inflation section 46, the folded part of the push-out part 62 is larger in dimension than the folded part of the window covering part. Dimension of the folded part refers to a distance between the position K1 and the position K2 respectively at the top end and the bottom end of the deployed upper end side inflation section 46. Thus, in the push-out part 62, the fold P1 and the fold P2 are both located within the upper-end side inflation section 46.

The jump stand 80 is thus provided to help the folded airbag 16 move inward towards the passenger compartment along the jump stand 80 (in the direction shown by the arrow B in FIG. 3) upon inflation of the upper-end side inflation section 46. The supplemental inflation part 46B of the upper-end side inflation section 46 of the airbag 16 forms the push-out part 62 that corresponds to the upper part of the B-pillar garnish 60. The distance between the position K1 and the position K2 respectively at the top end and the bottom end of the deployed upper-end side inflation section 46 of the pillar covering part is lager than the distance between the position K1 and the position K2 respectively at the top end and the bottom end of the deployed upper-end side inflation section 46 of the window covering part. Thus, the upper-end side inflation section 46 is folded back at both the folds P1 and P2. This allows the push-out part 62 of the upper-end side inflation section 46 to protrude further into the passenger compartment than the window covering part.

Thus, the airbag 16 is pushed out in the direction shown by the arrow B with greater force. Consequently, as shown by the chain double-dashed line in FIG. 3, the terminal part 78B of the headliner 78 is largely opened so that the airbag 16 deploys smoothly downward along the side of the vehicle body in the passenger compartment without interference from the top end 60A of the B-pillar garnish 60.

As shown in FIG. 3, B-pillar has an inner panel 81 and an outer panel 83.

As shown in FIG. 1, the rear inflation section 36 of the airbag 16 is constituted by three cylindrical cells 90, 92, 94 arranged next to each other in the vehicle longitudinal direction. The cylindrical cells 90, 92, 94 extend approximately in the vehicle height direction.

The front cell 90 and the rear cell 94 have respective upper-end openings. These openings connect to a rear part 46C of the upper-end side inflation section 46. The center cell 92 has a gas introducing part 96 at its vertical center portion on the forward side. The center cell 92 connects through the gas introducing part 96 to the vertical center portion of the front cell 90 on its rearward side. The center cell 92 also has a gas introducing part 98 at its lower end portion on the rearward side. The center cell 92 connects through the gas introducing part 98 to the lower end portion of the rear cell 94 on its forward side.

Thus, gas injected from the inflator 12, flows through the upper-end side inflation section 46 downward into the front cell 90 and the rear cell 94, as well as into the center cell 92 through the gas introducing parts 96 and 98 along the path W2. The vertical center portion of the front cell 90 on its rearward side connects through the gas introducing part 96 to the vertical center portion of the cell 92 on its forward side. The lower end portion of the cell 92 on its rearward side connects through the gas introducing part 98 to the lower end portion of the cell 94 on its forward side.

When the airbag 16 is deployed, a C-pillar garnish 100 is situated on the side of the deployed airbag that faces the outside of the vehicle, near the central portion of the cell 92 in the vehicle longitudinal direction. In the side view, the pillar covering part of the upper-end side inflation section 46 overlaps the C-pillar garnish 100, and has a semicircular supplemental inflation part 46D that protrudes downward. Specifically, the pillar covering part of the upper-end side inflation section 46 is provided at a location corresponding to the upper part of the C-pillar garnish 100 to form a push-out part 102. Also, the upper-end side inflation section 46 includes a window covering part, which does not overlap the C-pillar garnish 100. The window covering part is provided at a location corresponding to the upper part of a side window 63. When the upper-end side inflation section 46 is deployed, a sectional area S1 of the push-out part 102 is at least larger than a sectional area S2 of the window covering part, when viewed in the vehicle longitudinal direction.

Therefore, when the upper-end side inflation section 46 has been deployed, the push-out part 102 (pillar covering part) protrudes further into the passenger compartment than the window covering part.

Although not shown, a metal jump stand is provided immediately above the top end of the C-pillar garnish 100, a metal jump stand is provided as an airbag guide mechanism, as in the case with the B-pillar garnish 60 shown in FIG. 3. The jump stand is fastened to the roof side rail inner panel with a fastening member.

Thus, above the C-pillar garnish 100, the airbag 16 is pushed towards the passenger compartment with greater force in the same manner as the case with the B-pillar garnish 60. Consequently, the terminal part 78B of the headliner 78 is largely opened so that the airbag 16 deploys smoothly downward along the side of the vehicle body in the passenger compartment without interference from the top end 100A of the C-pillar garnish 100.

Now, functions and effects of the first embodiment are described.

When a side collision or rollover occurs, the side collision sensor or the rollover sensor detects the occurrence of the side collision or rollover, and outputs the condition to the airbag controller. If the airbag controller determines that a side collision or rollover has occurred, the inflator 12 is activated to supply gas into the folded airbag 16 that is stored along the roof side rail section 14 of the vehicle.

Specifically, the inflator 12 supplies gas along the paths W1 and W2 through the gas introducing part 47 of the airbag 16 to inflate the upper-end side inflation section 46, the front inflation section 28, and the rear inflation section 36, such that the airbag 16 is deployed downward in a curtain shape along the side vehicle body in the passenger compartment. This allows the front inflation section 28 to protect the head 27A of the occupant 27 seated on the front seat 26, while allowing the rear inflation section 36 to protect the head 31A of the occupant 31 seated on the rear seat 30.

In the head protecting airbag system 10 according to the first embodiment of the invention, the folded airbag 16 is stored above the top end 60A of the B-pillar garnish 60 and the top end 100A of the C-pillar garnish 100. Also, the airbag 16 is deployed inward towards the passenger compartment over the top end 60A of the B-pillar garnish 60 and the top end 100A of the C-pillar garnish 100.

In the first embodiment of the invention, the jump stand 80 is provided above each of the top end 60A of the B-pillar garnish 60 and the top end 100A of the C-pillar garnish 100. This helps the folded airbag 16 move inward towards the passenger compartment (in the direction shown by the arrow B in FIG. 3) along the jump stand 80 upon inflation of the upper-end side inflation section 46 in the process of deployment of the airbag 16.

In addition, in the side view of the deployed airbag 16, the pillar covering part of the upper-end side inflation section 46 overlaps the B-pillar garnish 60. In the pillar covering part, the supplemental inflation part 46B protrudes downward into a semicircular shape to form the push-out part 62. In turn, in the side view of the deployed airbag 16, the other pillar covering part of the upper-end side inflation 46 overlaps the C-pillar garnish 100. In the other pillar part, the supplemental inflation part 46D protrudes downward into a semicircular shape to form the push-out part 102. Therefore, when the upper-end side inflation section 46 is deployed, the sectional area S1 of the push-out part 62 or 102 is at least larger than the sectional area S2 of the window covering part, if viewed in the longitudinal direction. In the push-out parts 62 and 102, the airbag 16 is folded back at both the fold P1 and the fold P2.

Therefore, when the upper-end side inflation section 46 has been deployed, the push-out parts 62 and 102 protrude further into the passenger compartment than the window covering part. Thus, the airbag 16 is pushed towards the passenger compartment (in the direction shown by the arrow B in FIG. 3) with greater force. Consequently, as shown by the chain double-dashed line in FIG. 3, the terminal part 78B of the headliner 78 is largely opened so that the airbag 16 is deployed smoothly downward along the side of the vehicle body in the passenger compartment without interference from the top end 60A of the B-pillar garnish 60 or the top end 100A of the C-pillar garnish 100.

Therefore, the first embodiment of the invention allows the airbag 16 to be deployed between the head 27A of the occupant 27 and the side of the vehicle body and between the head 31A of the occupant 31 and the side of the vehicle body without interference from the top end 60A of the B-pillar garnish 60 and the top end 100A of the C-pillar garnish 100.

A head protecting airbag system according to the second embodiment of the invention will be described below with reference to FIG. 4.

Common components between the first and the second embodiments are denoted with the same reference numerals, and descriptions thereof will not be repeated.

Figure 4:
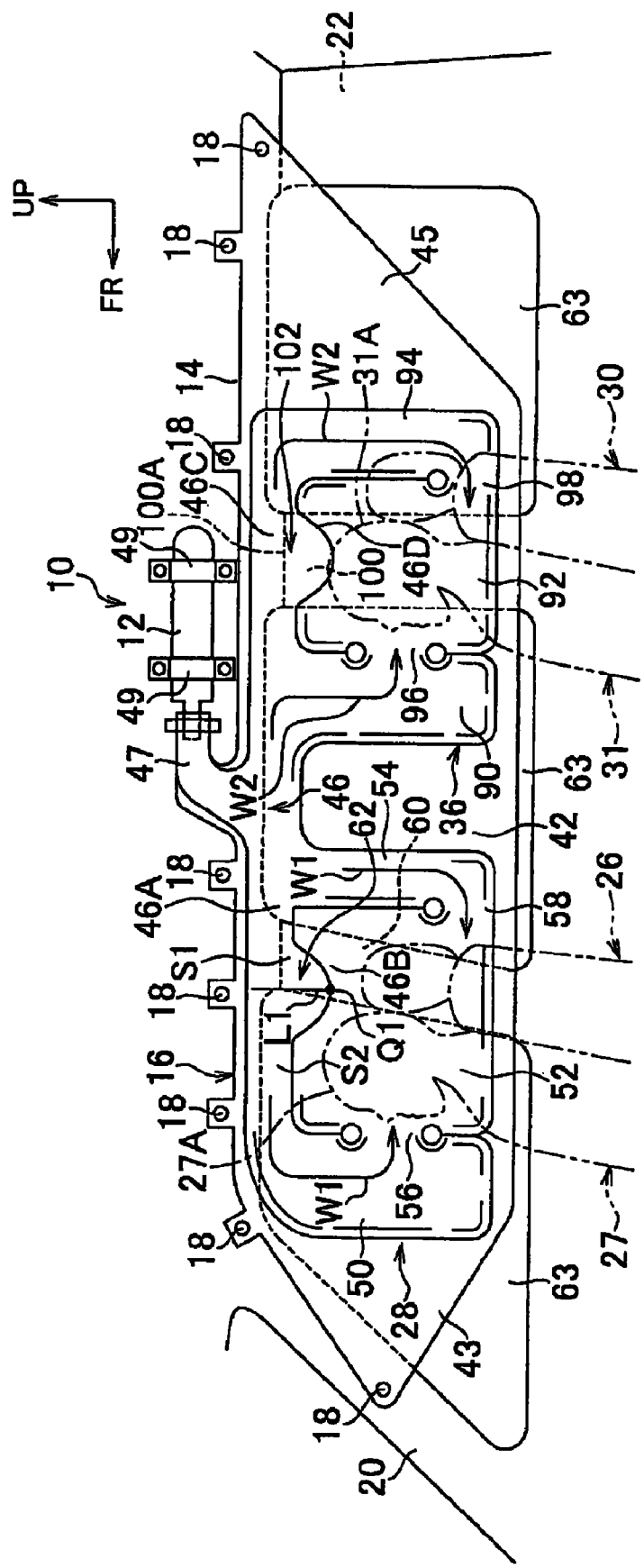
FIG. 4 is a side view of a head protecting airbag system according to the second embodiment of the invention, in the deployed state.

FIG. 4 is a side view of a head protecting airbag system 10 according to the second embodiment, in the operation of which an airbag 16 has been deployed.

As shown in FIG. 4, in the second embodiment of the invention, the semicircular supplemental inflation part 46B formed in the airbag 16 is displaced forward relative to the B-pillar garnish 60. The supplemental inflation part 46B is displaced relative to the B-pillar garnish 60 within a range as long as a lowest peripheral point Q1 of the supplemental inflation part 46B overlaps the B-pillar garnish 60 in the side view. The lowest peripheral point Q1 is located on a vertically extending axis L1 of the supplemental inflation part 46B.

The second embodiment of the invention therefore provides the same functions and effects as those obtained in the first embodiment. As the supplemental inflation part 46B is displaced forward relative to the B-pillar garnish 60, the push-out part 62 of the upper-end side inflation section 46 is accordingly displaced forward relative to the jump stand 80, which is provided immediately above the top end 60A of the B-pillar garnish 60. This reduced the downward load on the lateral wall 80B of the jump stand 80 upon inflation of the supplemental inflation part 46B. Therefore, a jump stand 80 having reduced rigidity and strength may be used, resulting in reduced weight by using a thinner plate or a different material.

Alternatively, the supplemental inflation part 46B may be displaced rearward relative to the B-pillar garnish 60. In addition, the supplemental inflation part 46D on the rear seat side may be displaced forward or rearward relative to the C-pillar garnish 100.

A head protecting airbag system according to the third embodiment of the invention will be described below with reference to FIGS. 5 to 7.

Common components between the first and the third embodiments are denoted with the same reference numerals, and descriptions thereof will not be repeated.

Figure 5:
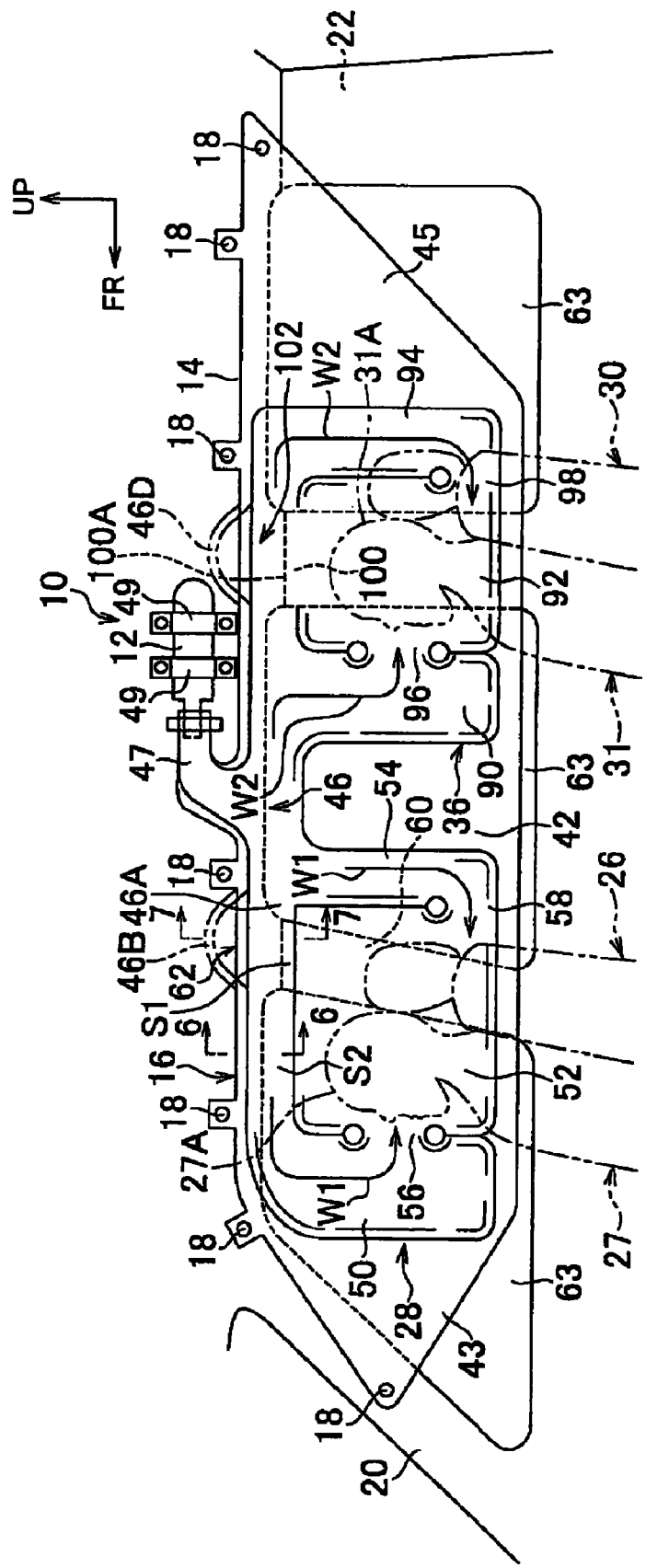
FIG. 5 is a side view of a head protecting airbag system according to the third embodiment of the invention, in the deployed state.

FIG. 5 is a side view of a head protecting airbag system 10 according to the third embodiment, in the operation of which an airbag 16 has been deployed.

As shown in FIG. 5, in the third embodiment of the invention, the upper-end side inflation section 46 includes a supplemental inflation part 46B, which serves as a pillar covering part, at which the upper-end side inflation section 46 overlaps the B-pillar garnish 60 in the side view where the airbag 16 has been deployed. The supplemental inflation part 46B is formed to deploy upward into a semicircular shape. Specifically, the pillar covering part of the upper-end side inflation section 46 is provided at a location corresponding to the upper part of the B-pillar garnish 60 to form a push-out part 62. Also, the upper-end side inflation section 46 includes a window covering part, which does not overlap the B-pillar garnish 60. The window covering part is provided at a location corresponding to the upper part of a side window 63. When the upper-end side inflation section 46 is deployed, a sectional area S1 of the push-out part 62 is at least larger than a sectional area S2 of the window covering part, when viewed in the vehicle longitudinal direction.

Also, the upper-end side inflation section 46 includes a supplemental inflation part 46D, which serves as a pillar covering part, at which the upper-end side inflation section 46 overlaps the C-pillar garnish 100 in the side view where the airbag 16 is deployed. The supplemental inflation part 46D is formed to deploy upward into a semicircular shape. Specifically, the pillar covering part of the upper-end side inflation section 46 is provided at a location corresponding to the upper part of the C-pillar garnish 100 to form a push-out part 102. Also, the upper-end side inflation section 46 includes a window covering part, which does not overlap the C-pillar garnish 100. The window covering part is provided at a location corresponding to the upper part of a side window 63. When the upper-end side inflation section 46 is deployed, a sectional area S1 of the push-out part 102 is at least larger than a sectional area S2 of the window covering part, when viewed in the vehicle longitudinal direction.

In FIG. 5, the supplemental inflation parts 46B and 46D are shown by the chain double-dashed line. This is because, in the process of deploying the airbag 16, the roof side rail section 14 prevents the supplemental inflation parts 46B and 46D from deploying upward. Thus, while the supplemental inflation parts 46B and 46D do not deploy into a shape shown by the chain double-dashed line in FIG. 5, the push-out parts 62 and 102 are deployed inward towards the passenger compartment.

Therefore, when the upper-end side inflation section 46 is deployed, the push-out parts 62 and 102 protrude further into the passenger compartment than the window covering part.

Figure 6:
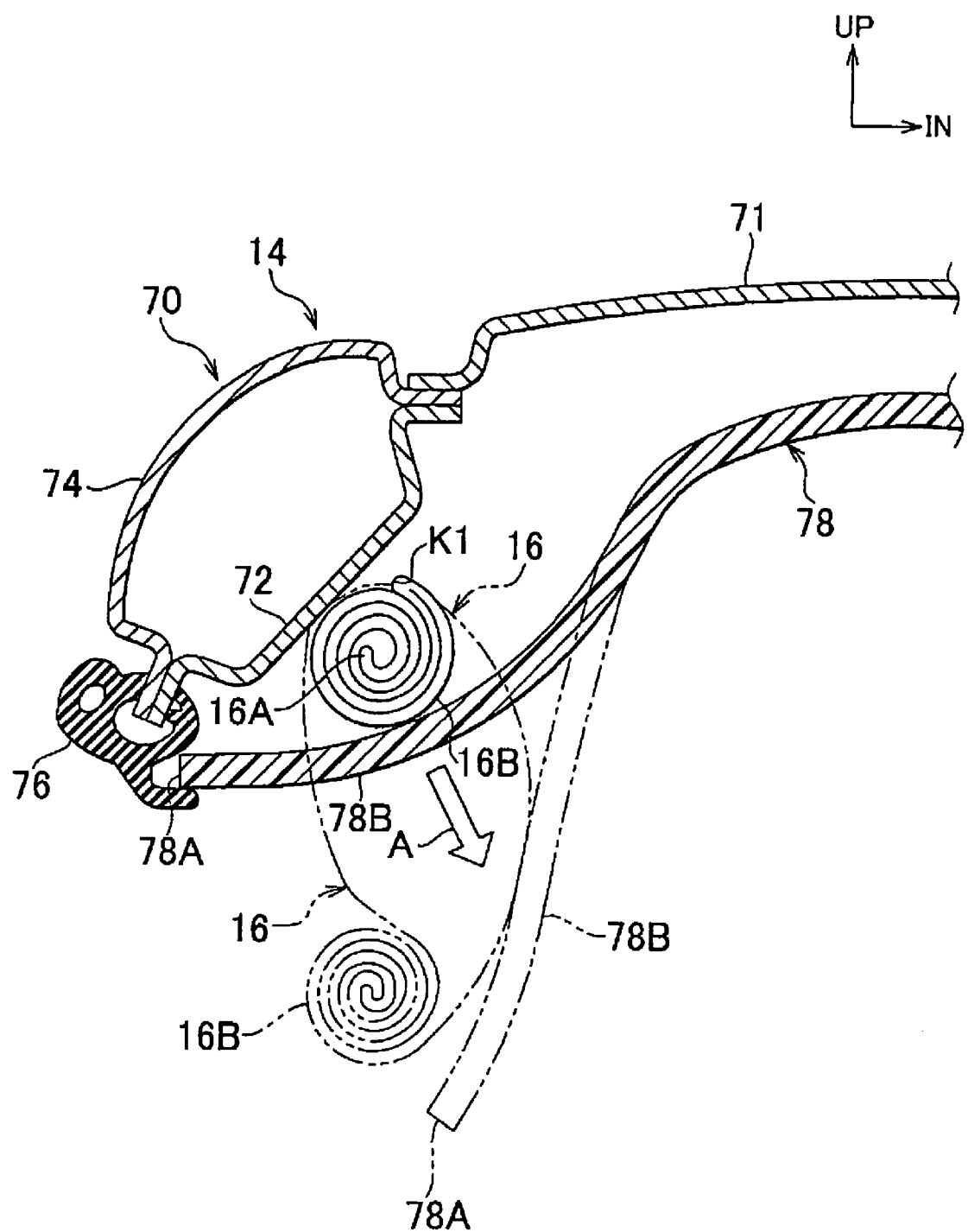
FIG. 6 is an enlarged sectional view taken along the line 6-6 in FIG. 5, illustrating the stored air bag.

FIG. 6 is an enlarged sectional view taken along the line 6-6 in FIG. 5, illustrating the stored airbag. FIG. 7 is an enlarged sectional view taken along the line 7-7 in FIG. 5, illustrating the stored airbag.

As shown in FIG. 6, the airbag 16 includes the bottom end part 16A and the rolled part 16B. The bottom end part 16A is located at the bottom end of the airbag 16 when the airbag 16 has been deployed. The rolled part 16B is formed by rolling-up the airbag 16 from the bottom end part 16A. The window covering part of the upper-end side inflation section 46 of the airbag 16 does not have the push-out part 62 or overlap the B-pillar garnish 60 in the side view. In the window covering part, the position K1 is located immediately above the rolled part 16B. When the upper-end side inflation section 46 is deployed, the position K1 is at the top end of the upper-end side inflation section 46. Thus, inflating the upper-end side inflation section 46 allows the rolled part 16B of the airbag 16 to be pushed toward the passenger compartment (in the direction shown by the arrow A in FIG. 6). Consequently, as shown by the chain double-dashed line in FIG. 6, the headliner edge 78A of the headliner 78 disengages from the opening trim 76, while the terminal part 78B of the headliner 78 is opened toward the passenger compartment. This allows the airbag 16 to be deployed downward along the side of the vehicle body in the passenger compartment.

As shown in FIG. 5, the push-out part 62 is formed in the pillar covering part of the upper-end side inflation section 46 of the airbag 16. Accordingly, in the pillar covering part, the upper-end side inflation section 46 is larger in dimension in the vehicle height direction. Consequently, as shown in FIG. 7, when the upper-end side inflation section 46 is deployed, the position K1 at the top end of the deployed upper-end side inflation section 46 is interposed between the rolled part 16B and the longitudinal wall 80A of the jump stand 80 and reaches close to the lateral wall 80B.

Therefore, in the side view where the upper-end side inflation section 46 of the airbag 16 overlaps the B-pillar garnish 60, the supplemental inflation part 46B protrudes into a semicircular shape to form the push-out part 62. Also, the position K1 at the top end of the deployed upper-end side inflation section 46 is located between the rolled part 16B and the longitudinal wall 80A of the jump stand 80 and close to the lateral wall 80B. This allows the upper-end side inflation section 46 to be largely inflated.

Thus, the airbag 16 is pushed towards the passenger compartment (in the direction shown by the arrow B in FIG. 7) with greater force. Consequently, as shown by the chain double-dashed line in FIG. 7, the terminal part 78B of the headliner 78 is largely opened so that the airbag 16 is deployed smoothly downward along the side of the vehicle body in the passenger compartment without the top end 60A of the B-pillar garnish 60.

Deploying the supplemental inflation part 46B between the rolled part 16B and the longitudinal wall 80A of the jump stand 80 pushes the airbag 16 towards the passenger compartment (in the direction shown by the arrow B in FIG. 7) with greater force. This reduces the downward load on the lateral wall 80B of the jump stand 80. Therefore, the jump stand 80 is allowed to have reduced rigidity and strength, resulting in reduced weight by using a thinner plate or a different material.

In the side view, the pillar covering part of the upper-end side inflation section 46 overlaps the C-pillar garnish 100, and also has a supplemental inflation part 46D protruding upward into a semicircular shape to form the push-out part 102, in the same manner as the supplemental inflation part 46B.

Thus, the third embodiment of the invention also provides the same functions and the effects as those obtained in the first embodiment. In the third embodiment, the supplemental inflation parts 46B and 46D are formed on the upper side of the upper-end side inflation section 46 in the vehicle. Thus, the supplemental inflation parts 46B and 46D are provided easily, having no adverse effect on the shapes of the cells 52 and 92 provided on the lower side of the upper-end side inflation section 46. At the same time, the sectional areas of the push-out parts 62 and 102, viewed in the vehicle longitudinal direction, as well as the number of times to fold the push-out parts 62 and 102 are adjusted easily. Thereby, the force to push out the rolled part 16B of the airbag 16 inward towards the passenger compartment is also adjusted easily.

Therefore, by using the simple structure, the third embodiment of the invention allows the airbag 16 to be deployed between the occupant's head 27A and the side of the vehicle body and between the occupant's head 31A and the side of the vehicle body without interference from the top end 60A of the B-pillar garnish 60 and the top end 100A of the C-pillar garnish 100.

A head protecting airbag apparatus according to the fourth embodiment of the invention will be described below with reference to FIG. 8.

Common components between the third and the fourth embodiments are denoted with the same reference numerals, and descriptions thereof will not be repeated.

Figure 7:
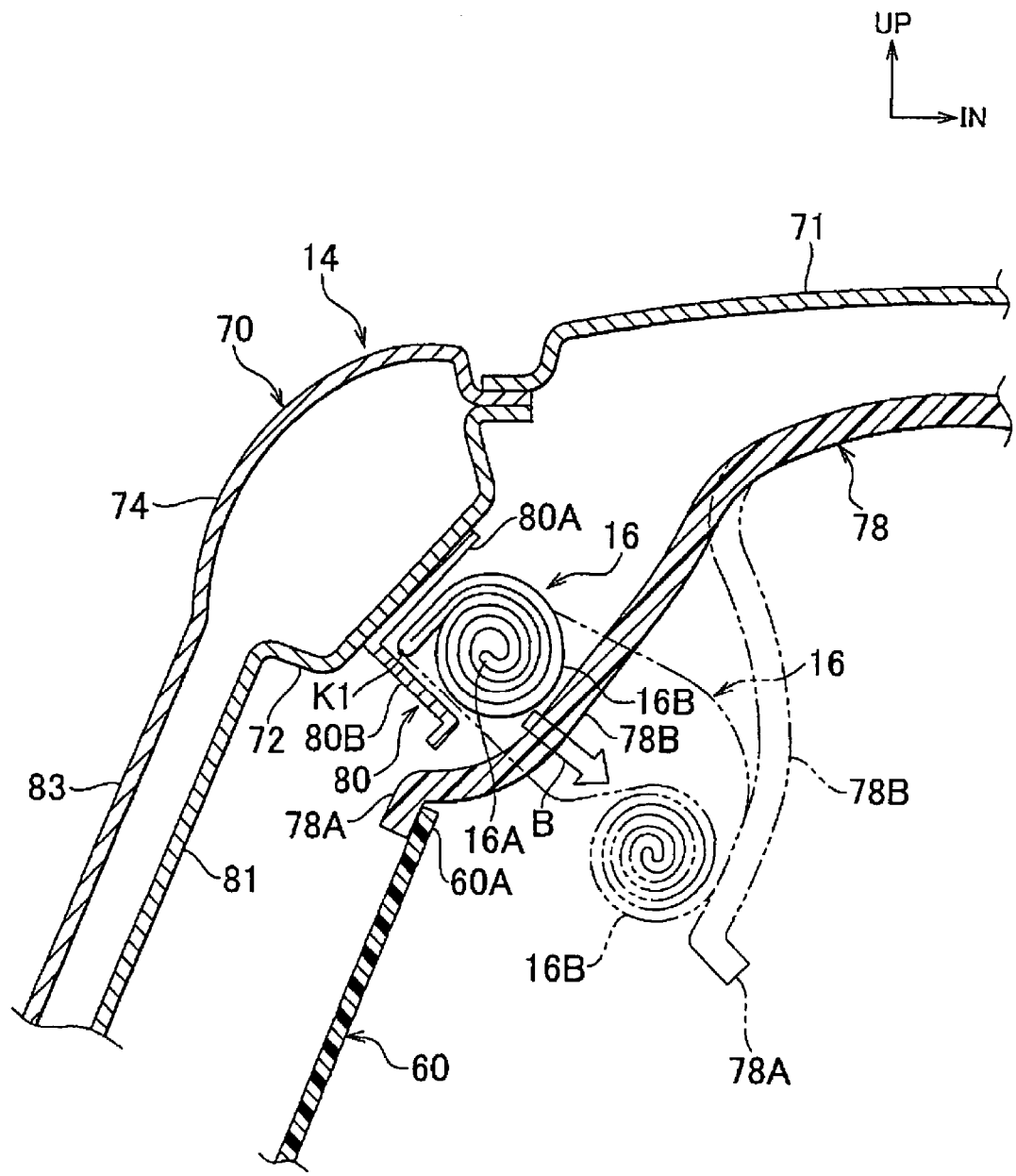
FIG. 7 is an enlarged sectional view taken along die line 7-7 in FIG. 5, illustrating the stored air bag.
Figure 8:
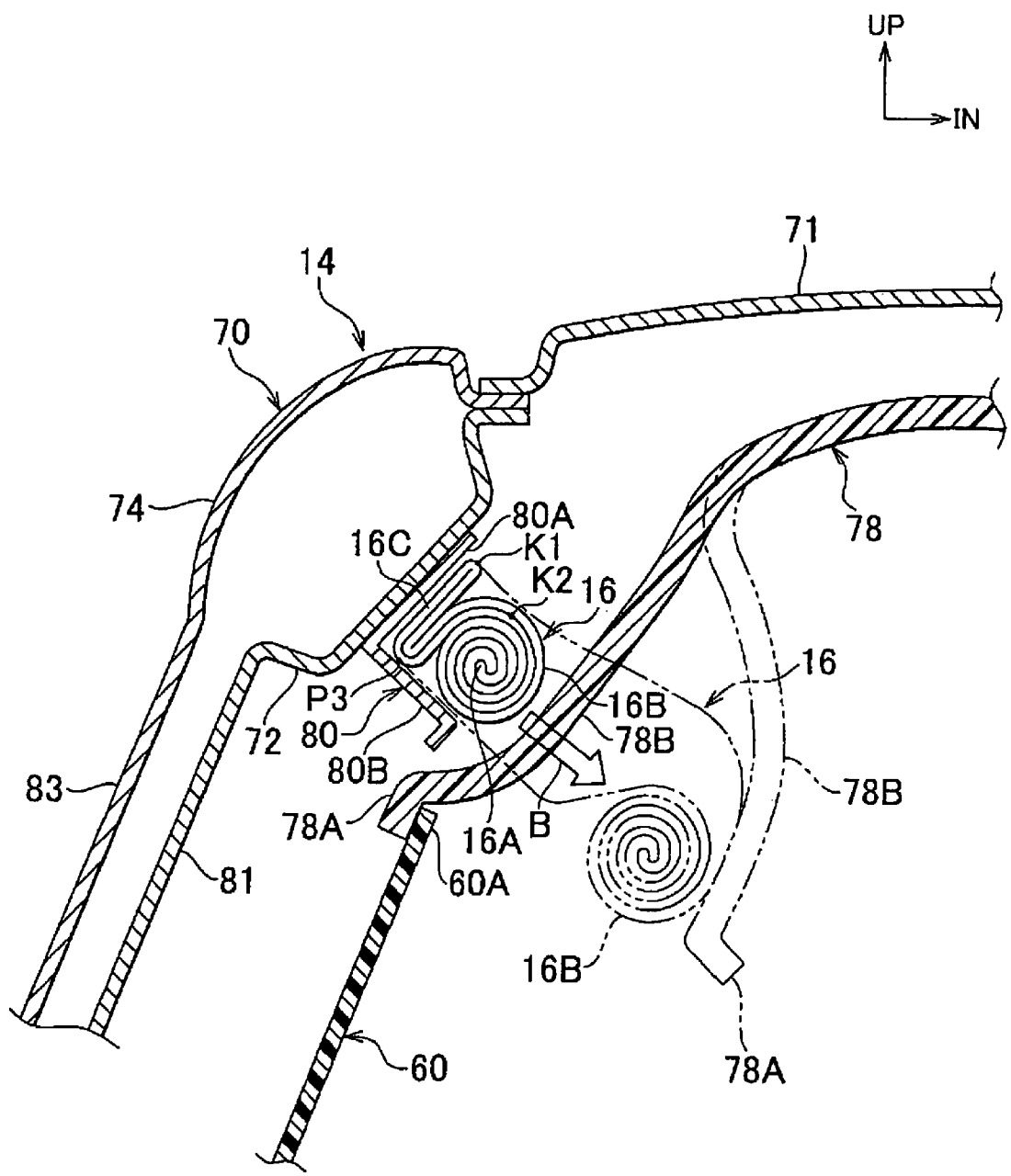
FIG. 8 is a sectional view of a head protecting airbag system according to the fourth embodiment of the invention, which corresponds to FIG. 7.

FIG. 8 is a sectional view of the head protecting airbag system 10 according to the fourth embodiment of the invention, which correspond to FIG. 7.

In the fourth embodiment of the invention, as shown in FIG. 8, in the push-out part 62, the airbag 16 is larger in dimension in the vehicle height direction. When the upper-end side inflation section 46 has been deployed, a fold P3 is formed between the position K1 at the top end of the upper-end side inflation section 46 and the position K2 at the bottom end thereof. The airbag 16 also includes the folded part 16C located between the rolled part 16B and the longitudinal wall 80A of the jump stand 80.

Thus, inflating the folded part 16C during the initial stage of deployment of the airbag 16 allows the rolled part 16B of the airbag 16 to be pushed towards the passenger compartment (in the direction shown by the arrow B in FIG. 8) with greater force. Consequently, the terminal part 78B of the headliner 78 is largely opened so that the airbag 16 is deployed smoothly downward along the side of the vehicle body in the passenger compartment without interference from the top end 60A of the B-pillar garnish 60.

A head protecting airbag apparatus according to the fifth embodiment of the invention will be described below with reference to FIG. 9.

Common components between the third and the fifth embodiments are denoted with the same reference numerals, and descriptions thereof will not be repeated.

Figure 9:
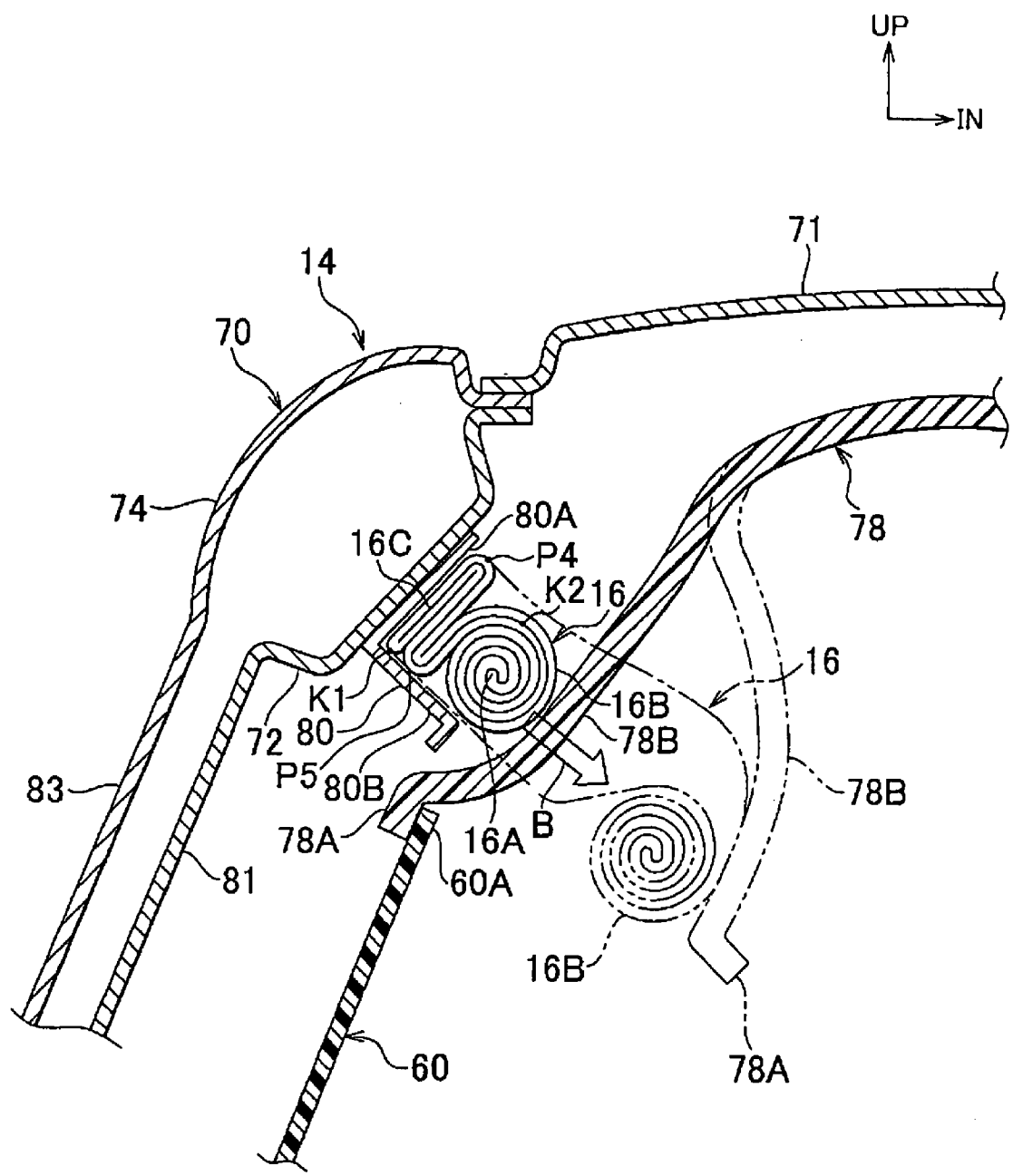
FIG. 9 is a sectional view of a head protecting airbag system according to the fifth embodiment of the invention, which corresponds to FIG. 8.

FIG. 9 is a sectional view of the head protecting airbag system 10 according to the fifth embodiment of the invention, which corresponds to FIG. 7.

In the fifth embodiment of the invention, as shown in FIG. 9, in the push-out part 62, the airbag 16 is further larger in dimension in the vehicle height direction. When the upper-end side inflation section 46 is deployed, folds P4 and P5 are formed between the position K1 at the top end of the upper-end side inflation section 46 and the position K2 at the bottom end thereof. The airbag 16 also includes the folded part 16C located between the rolled part 16B and the longitudinal wall 80A of the jump stand 80.

Thus, inflating the folded part 16C during the initial stage of deployment of the airbag 16 pushes the rolled part 16B of the airbag 16 towards the passenger compartment (in the direction shown by the arrow B in FIG. 9) with greater force. Consequently, the terminal part 78B of the headliner 78 is largely opened so that the airbag 16 deploys smoothly downward along the side of the vehicle body in the passenger compartment without interference from the top end 60A of the B-pillar garnish 60.

Although the detailed descriptions of the specific embodiments of the invention have been provided, the present invention is not limited to the aforementioned embodiments, but various other embodiments may also be allowed without departing the scope of the invention For example, in the aforementioned embodiments, the supplemental inflation parts 46B and 46D, which form the respective push-out parts 62 and 102, have a semicircular shape when viewed from the side of the vehicle. However, the present invention is not limited to the described shape. Alternatively, the supplemental inflation parts 46B and 46D may have other shapes, such as, for example, a semi-oval shape, when viewed from the side of the vehicle.

Also, in the aforementioned embodiments, although the invention is applied to the vehicle with two-row seating including the front seat 26 and the rear seat 30, the invention is not limited to that. The invention may also be applied to vehicles with three-row seating or other seating arrangement.

Further, the gas injecting portion of the inflator 12 is directly inserted into the gas introducing section 47 of the airbag 16 to fix the inflator 12 to the gas introducing section 47. However, the invention is not limited to that. Alternatively, a diffuser (pipe) or other member may be used to connect the gas introducing section 47 and the inflator 12. Still further, the inflator centering arrangement is employed, in which the inflator 12 is located at around the longitudinal middle of the upper edge side of the airbag 16. Alternatively, other arrangement may be employed, in which the inflator 12 is provided, for example, at the location of the garnish of the D-pillar 22.

Still further, one inflator 12 is used to inject gas into the airbag 16 in the described embodiments. However, the invention is not limited to that. Alternatively, two or more inflators 12 may be used to inject gas into the airbag 16.

What is claimed is:

1. A head protecting airbag system comprising:
   an inflator located in a predetermined position on a vehicle, that is activated upon at least one of a side collision and a rollover of the vehicle;
   an airbag including a gas supply path connected to the inflator, and an inflation section connected to the gas supply path to protect a head of an occupant, wherein the airbag is folded up in a vehicle height direction and stored along a roof side rail section of the vehicle, and is deployed by gas from the inflator downward along a side of a vehicle body in a passenger compartment;
   a pillar garnish provided on a side of the vehicle body in the passenger compartment; and
   an airbag guide mechanism, provided at a location above the pillar garnish, that guides the deployment of the airbag toward the passenger compartment, wherein:
   the gas supply path includes a pillar covering part provided at a location corresponding to an upper part of the pillar garnish and a window covering part provided at a location corresponding to an upper part of a side window of the vehicle;
   when the airbag is deployed, the pillar covering part protrudes further into the passenger compartment than the window covering part;
   the airbag is folded in a manner so that a lower part of the airbag deployed is rolled and an upper part of the airbag deployed is folded; and
   a folded part of the pillar covering part is larger in dimension than a folded part of the window covering part, and is folded more times than the folded part of the window covering part.

2. The head protecting airbag system according to claim 1, wherein the pillar covering part is provided with a supplemental inflation section to deploy upward from the gas supply path when the airbag is deployed.

3. The head protecting airbag system according to claim 2, wherein:
   the airbag guide mechanism is a plate member formed into an approximately L-shape and that includes a longitudinal wall fixed to the roof side rail section and a lateral wall;

the lateral wall protrudes inward towards the passenger compartment from a point connected to the longitudinal wall;

the airbag is folded in a manner such that the airbag is rolled upward on the side away from a center line of the vehicle extending in the vehicle longitudinal direction, and the airbag is stored in the roof side rail section; and a top end of the pillar covering part is located between the longitudinal wall and a rolled part of the airbag.

4. The head protecting airbag system according to claim 3, wherein the airbag is stored in the roof side rail section such that:

in the window covering part, a position that is the top end of the gas supply path of the airbag in the deployed state is located immediately above a rolled part of the airbag; and in the pillar covering part, a position that is the top end of the gas supply path of the airbag in the deployed state is located between a rolled part of the airbag and the longitudinal wall of the airbag guide mechanism.

5. The head protecting airbag system according to claim 3, wherein the airbag is stored in the roof side rail section such that:

a fold portion is formed between a position at the top end of the gas supply path of the airbag in the deployed state and a position at the bottom end of the gas supply path of the airbag in the deployed state; and the fold portion of the airbag is located between a rolled part of the airbag and the longitudinal wall of the airbag guide mechanism.

6. The head protecting airbag system according to claim 3, wherein the airbag is stored in the roof side rail section such that:

fold portions are formed between a position at the top end of the gas supply path of the airbag in the deployed state and a position at the bottom end of the gas supply path of the airbag in the deployed state; and the fold portions of the airbag are located between a rolled part of the airbag and the longitudinal wall of the airbag guide mechanism.

7. The head protecting airbag system according to claim 2, wherein:

the airbag guide mechanism is a plate member formed into an approximately L-shape and that includes a longitudinal wall fixed to the roof side rail section and a lateral wall;

the lateral wall protrudes inward towards the passenger compartment from a point connected to the longitudinal wall;

the airbag is folded in a manner such that the airbag is rolled upward on the side away from a center line of the vehicle extending in the vehicle longitudinal direction, and the airbag is stored in the roof side rail section; and the airbag is stored in the roof side rail section such that: in the window covering part, a first fold portion is formed between a position at the top end of the gas supply path of the airbag in the deployed state and a position at the bottom end of the gas supply path of the airbag in the deployed state, and a second fold portion is formed at the inflation portion of the airbag; and in the pillar covering part, the first and second fold portions are formed between a position at the top end of the gas supply path of the airbag in the deployed state and a position at the bottom end of the gas supply path of the airbag in the deployed state.

8. The head protecting airbag system according to claim 1, wherein the pillar covering part is provided with a supplemental inflation section to deploy downward from the gas supply path when the airbag is deployed.

9. The head protecting airbag system according to claim 1, wherein:

the airbag guide mechanism is a plate member formed into an approximately L-shape including a longitudinal wall fixed to the roof side rail section and a lateral wall; and the lateral wall protrudes inward towards the passenger compartment from a portion connected to the longitudinal wall.

10. The head protecting airbag system according to claim 9, wherein:

the pillar covering part is provided with a supplemental inflation section to deploy downward from the gas supply path when the airbag is deployed;

the supplemental inflation section is disposed on one of forward and rearward sides of the vehicle relative to the pillar garnish; and a lowest peripheral point of the supplemental inflation part is located on an axis of the supplemental inflation part, the axis extending in the vehicle height direction, and the lowest peripheral point is at a location corresponding to the upper part of the pillar garnish.

11. The head protecting airbag system according to claim 1, wherein the inflation section further comprises:

a first cell having an upper-end opening that communicates with the gas supply path through the upper-end opening;

a second cell having an upper-end opening that communicates with the gas supply path through the upper-end opening; and a third cell, provided between the first cell and the second cell, wherein:

the third cell has a first gas introducing part and a second gas introducing part;

the first gas introducing part is provided at a vertical center of the third cell, on a side closer to the first cell, that connects the first cell and the third cell; and the second gas introducing part is provided at a vertical lower end of the third cell, on a side closer to the second cell, that connects the second cell and the third cell.

12. The head protecting airbag system according to claim 1, wherein the airbag is deployed from the roof side rail section toward a space between a seat of the vehicle and the pillar garnish.

13. The head protecting airbag system according to claim 1, wherein the airbag is stored in the roof side rail section with the gas supply path being folded.

* * * * *